United States Patent
Stumphauzer, II (10) Patent No.: US 7,251,452 B2
(45) Date of Patent: Jul. 31, 2007

(54) SYSTEM AND METHOD FOR CREATING AND RECEIVING PERSONALIZED BROADCASTS

(75) Inventor: William C. Stumphauzer, II, South Lyon, MI (US)

(73) Assignee: Sirius Satellite Radio, New York, NY (US)

( * ) Notice: Subject to any disclaimer, the term of this patent is extended or adjusted under 35 U.S.C. 154(b) by 963 days.

(21) Appl. No.: 09/900,935

(22) Filed: Jul. 9, 2001

(65) Prior Publication Data

US 2003/0014767 A1 Jan. 16, 2003

(51) Int. Cl.
*H04H 7/00* (2006.01)

(52) U.S. Cl. .................. 455/3.06; 455/3.02; 455/154.1
(58) Field of Classification Search .............. 455/3.06, 455/427, 553, 557, 3.02, 154.1; 386/83; 700/94; 705/14; 725/131, 63, 66, 134, 110
See application file for complete search history.

(56) References Cited

U.S. PATENT DOCUMENTS

| | | | |
|---|---|---|---|
| 5,210,611 A | 5/1993 | Yee et al. | |
| 5,732,338 A | 3/1998 | Schwob | |
| 5,859,662 A | 1/1999 | Cragun et al. | |
| 5,864,753 A | 1/1999 | Morita et al. | |
| 5,867,205 A | 2/1999 | Harrison | |
| 5,880,768 A | 3/1999 | Lemmons et al. | |
| 6,005,597 A | 12/1999 | Barrett et al. | |
| 6,011,854 A * | 1/2000 | Van Ryzin | 381/77 |
| 6,021,320 A | 2/2000 | Bickford et al. | |
| 6,128,650 A | 10/2000 | De Vos et al. | |
| 6,133,909 A | 10/2000 | Schein et al. | |
| 6,192,340 B1 | 2/2001 | Abecassis | |
| 6,282,412 B1 * | 8/2001 | Lyons | 455/186.1 |
| 6,567,660 B1 * | 5/2003 | Wegener | 455/418 |
| 6,901,207 B1 * | 5/2005 | Watkins | 386/83 |
| 2001/0053944 A1 * | 12/2001 | Marks et al. | 700/94 |
| 2002/0055343 A1 * | 5/2002 | Stetzler et al. | 455/260 |
| 2002/0183059 A1 * | 12/2002 | Noreen et al. | 455/427 |
| 2003/0167202 A1 * | 9/2003 | Marks et al. | 705/14 |
| 2004/0103032 A1 * | 5/2004 | Maggio | 705/14 |
| 2004/0111742 A1 * | 6/2004 | Hendricks et al. | 725/34 |

OTHER PUBLICATIONS

Digitaler Hörfunk Über Rundfunksatelliten Digital Sound Service for Direct Broadcasting Satellites, P. Treytl, Editor, Information brochure by the Federal Minister of Records and Technology Bonn, Federal Republic of Germany.

* cited by examiner

*Primary Examiner*—Matthew Anderson
*Assistant Examiner*—Tan Trinh
(74) *Attorney, Agent, or Firm*—Kramer Levin Naftalis & Frankel LLP (57) ABSTRACT

A system and method automatically plays programming selections corresponding to the user's preferences as specified in a playlist. The user can create a playlist and transfer the playlist to a receiver. The receiver scans the content in all of the channels that are being broadcast to the receiver to determine if any of the programming matches the selections on the playlist. If there is a match, the receiver automatically tunes the receiver to the matching program.

35 Claims, 7 Drawing Sheets

SYSTEM AND METHOD FOR CREATING AND RECEIVING PERSONALIZED BROADCASTS

FIELD OF THE INVENTION

The present invention relates to a method and system for receiving personalized programming from a broadcasting system. More particularly, the system and method allow a user to create a playlist that directs a receiver to tune to programming that matches the selections contained in the playlist.

BACKGROUND INFORMATION

At any given moment, millions of people listen to the radio as either an activity in and of itself or to complement an activity that they are already engaged in, for example, driving. Unfortunately, many are dissatisfied with traditional radio because nearly half of all conventional radio systems broadcast in one of only three formats: country music; contemporary music; and news. In addition to the limited number of choices in programming, listeners are also constantly barraged with commercials. In some markets, listeners will hear up to eighteen minutes of commercials each hour. Thus, the limited choices and frequent commercials cause listeners to desire a superior system for receiving broadcasts that feature a variety of genres, with limited interruptions from commercials. One solution is satellite radio. Satellite radio can broadcast numerous channels of varied programming to receivers simultaneously. The producers of satellite radio can air these broadcasts with minimal commercial interruptions, thus enhancing the listeners' experience, such as the satellite radio service to be provided by Sirius Satellite Radio of New York, N.Y.

Having many radio channels provided by satellite signaling vastly improves a listener's enjoyment of radio. However, the multitude of channels may render it difficult for a listener to constantly scan and flip through all channels to select a program he would like to hear. Thus, it is desirable to have a system that allows a listener to create a playlist that contains selections of programming or types of programming he wants to hear, and to have the system automatically seek and tune in the selections listed in the playlist.

SUMMARY OF THE INVENTION

According to an exemplary embodiment of the present invention, a system and method are provided allowing a user to create a personalized playlist that features music or programs desired by the user. For example, such a system and method can be used with a satellite radio broadcasting system or a terrestrial broadcasting system. A receiver uses the playlist to determine what channels should be played to the user, based on the available programming selections. In an exemplary embodiment, the user logs on to a website and creates a virtual playlist specifying the desired selections, for example, in priority order. The playlist is subsequently transferred to a receiver. The receiver constantly monitors the available programming contents of all of the programming channels and determines if any of the programs being broadcast match any of the selections on the playlist. If a match exists, then the receiver automatically tunes in the channel playing the matching program.

BRIEF DESCRIPTION OF THE DRAWINGS

The accompanying drawings, which are incorporated in and constitute a part of the specification, illustrate an exemplary embodiment of the present invention.

DETAILED DESCRIPTION OF THE INVENTION

The present invention features a system and method that allow a user to create a personalized playlist. The receiver may automatically tune to a channel broadcasting the music or programming specified in the playlist. This system can be used for any type of audio or video broadcast system, for example, satellite radio.

Figure 1:
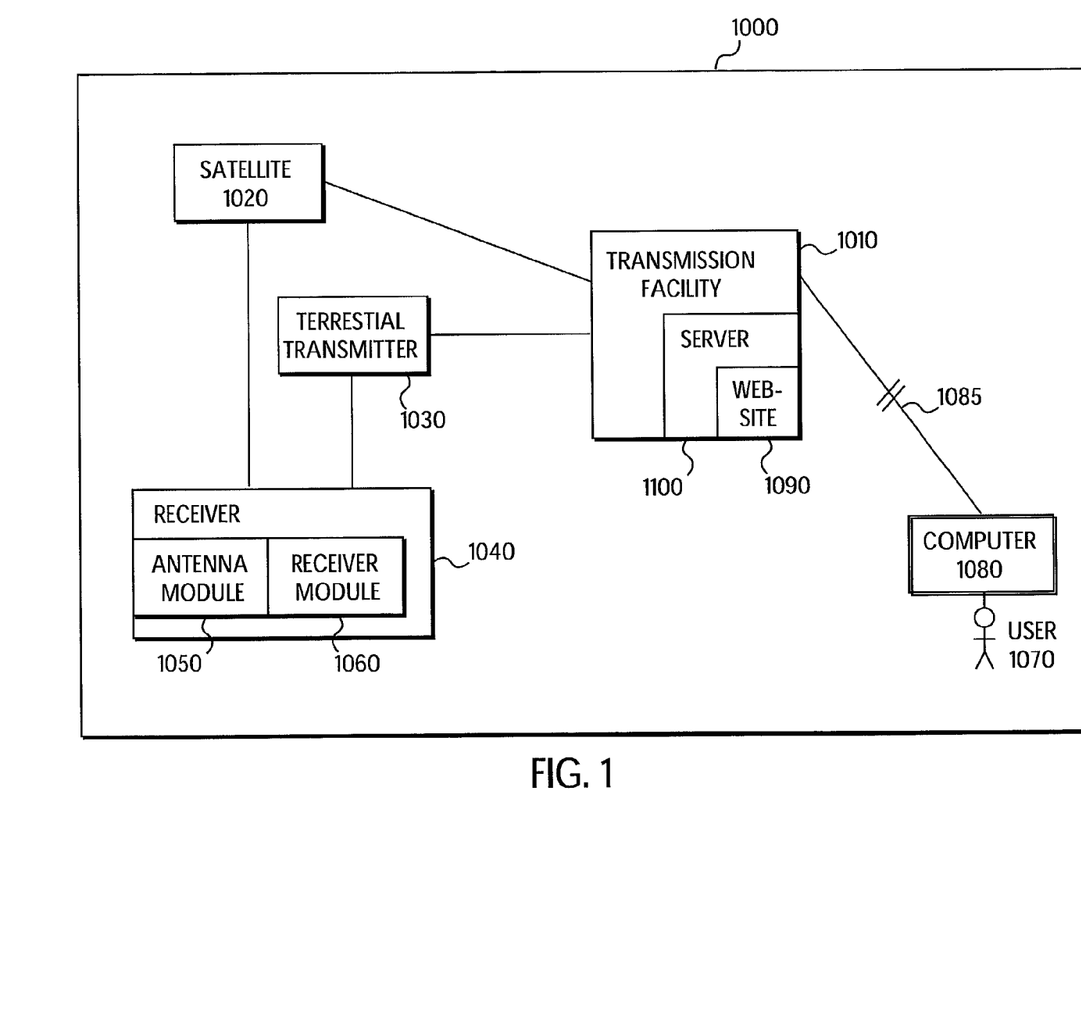
FIG. 1 illustrates an overview block diagram of an exemplary embodiment of a personalized broadcasting system.

FIG. 1 illustrates an overview of an exemplary embodiment of the personalized broadcasting system. A broadcasting system 1000 includes, for example, a transmission facility 1010, a satellite 1020, a terrestrial transmitter 1030, and a receiver 1040.

Transmission facility 1010 includes, for example, studios that produce programming to be broadcast and can include numerous different titles of prerecorded programming. Programming can be any type of programming suitable for broadcasting such as music, radio shows, television programs, news programs and emergency information. Transmission facility 1010 also relays the programming to satellite 1020 and, for example, to terrestrial transmitter 1030. An example of a terrestrial transmitter system used in conduction with a satellite broadcasting system is provided, for example, in U.S. Pat. Nos. 5,794,138 and 5,864,579 which are assigned to Sirius Satellite Radio and hereby incorporated by reference. In alternative embodiments, satellite 1020 can be replaced with known broadcasting systems such as FM radio, conventional cable, and digital cable.

Satellite 1020, such as an orbiting satellite or group of satellites, receives an uplink of programming and control data from transmission facility 1010 and transmits programming data on a downlink at frequencies that can be detected by receiver 1040, for example at 2.3 GHz. Such methods for satellite transmissions on an uplink and a downlink are known in the art. Examples of satellite transmissions for radio broadcasts are provided in, for example, U.S. Pat. Nos. 5,278,863; 5,319,673; 5,485,485; each of which are assigned to Sirius Satellite Radio and are hereby incorporated by reference. Terrestrial transmitter 1030 can supplement the signals from satellite 1020 or independently transmit the broadcast programming to highly populated and dense urban areas, where, for example, receiver 1040 is not able to receive sufficiently strong satellite signals (e.g., due to obstructions from buildings in urban areas).

Receiver 1040 receives the programming from satellite 1020 or terrestrial transmitter 1030. Receiver 1040 can be located in any type of radio or other apparatus, such as a cell phone or a personal digital assistant. For example, receiver 1040 can be located in various modes of transportation such as automobiles, buses, airplanes, trucks, motorcycles, trains, and boats. Receivers 1040 can also be located in portable radios such as boom-boxes, clock radios, and portable handheld radios. For example, receiver 1040 can be coupled to conventional audio systems to play the programming received from satellites 1020. Examples of receivers capable of receiving satellite signals are provided in, for example, U.S. Pat. Nos. 5,592,471; 5,794,138; and 6,023,616; each of which are assigned to Sirius Satellite Radio and are hereby incorporated by reference.

Receiver 1040 includes, for example, two primary components: an antenna module 1050; and receiver module 1060. Antenna module 1050 actively receives the signals being generated by satellite 1020 and/or terrestrial transmitter 1030. Once antenna module 1050 receives and processes (e.g., frequency conversion) a signal, it transfers the signal to receiver module 1060. Receiver module 1060 can then provide broadcast output of the signal for listening by a user. If necessary, for compatibility reasons with existing receiver systems, receiver module 1060 also may convert the received digital signal into an analog signal format suitable for processing by a preexisting audio system (e.g., a car radio), otherwise the received digital signals will be used without conversion to analog formats.

User 1070 can personalize the broadcast of programming from receiver 1040 by, for example, creating a playlist. To create this playlist, user 1070 uses, for example, a computer 1080 to access a website 1090 hosted by a server 1100 located in, for example, transmission facility 1010. Alternatively, server 1100 can be located in any designated location as long as a suitable communications link to the user 1070 and computer 1080 is provided. Computer 1080 can access website 1090 by using any communications link, such as a proprietary dial-up connection, a wireless connection, or a public network connection, such as the Internet. Server 1100 creates the playlist as described below. After the creation of the playlist, user 1070 transfers it to receiver 1040 in a desired manner, also as described below.

Figure 2:
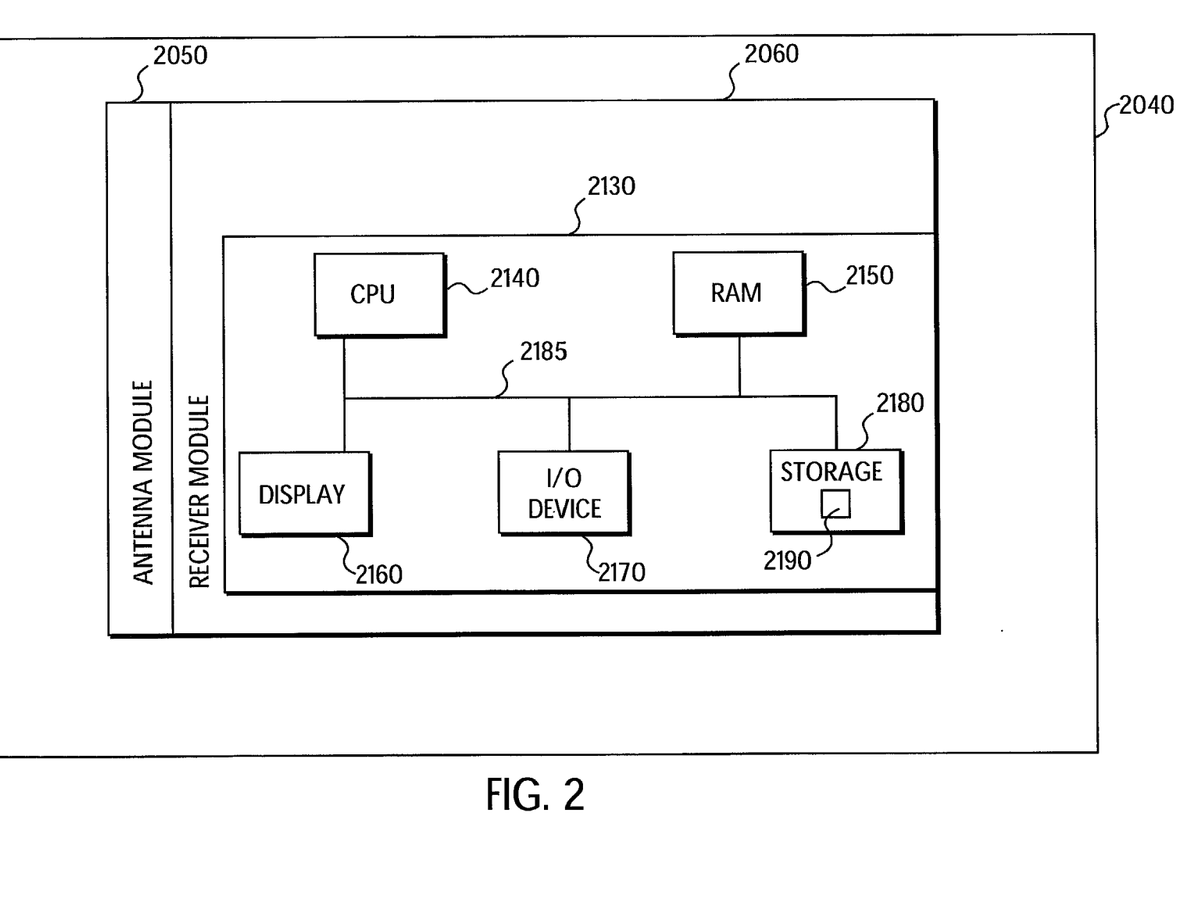
FIG. 2 illustrates a block diagram showing a receiver for use in the exemplary embodiment of the personalized broadcasting system.

FIG. 2 illustrates a block diagram showing a receiver for use in an exemplary embodiment of the personalized broadcasting system. Receiver 2040 includes, for example, antenna module 2050 and receiver module 2060 that are in communication with each other using conventional electronic circuitry. Within receiver module 2060, for example, is a receiver computer 2130. Receiver computer 2130 includes, for example, a central processing unit 2140, random access memory 2150, a display 2160, input/output device(s) 2170, and a storage device 2180. The components of receiver computer 2130 are coupled, for example, via a conventional bus 2190. Storage device 2180 contains, for example, a module 2190 that stores the playlist. Central processing unit (CPU) 2140 controls the operation of receiver 2040 (e.g., through the execution of software stored in memory 2180, including the user's playlist), ensuring that the digital signals being broadcast by transmission facility 1010 are played for the user in accordance with the priority set forth in the playlist. The CPU 2140 and the memory 2180 can use code that is written in any conventional programming language or other suitable high level language. Examples of programming languages include, but are not limited to, JAVA, HTML, object oriented programming language, C++, and Visual BASIC.

Figure 3:
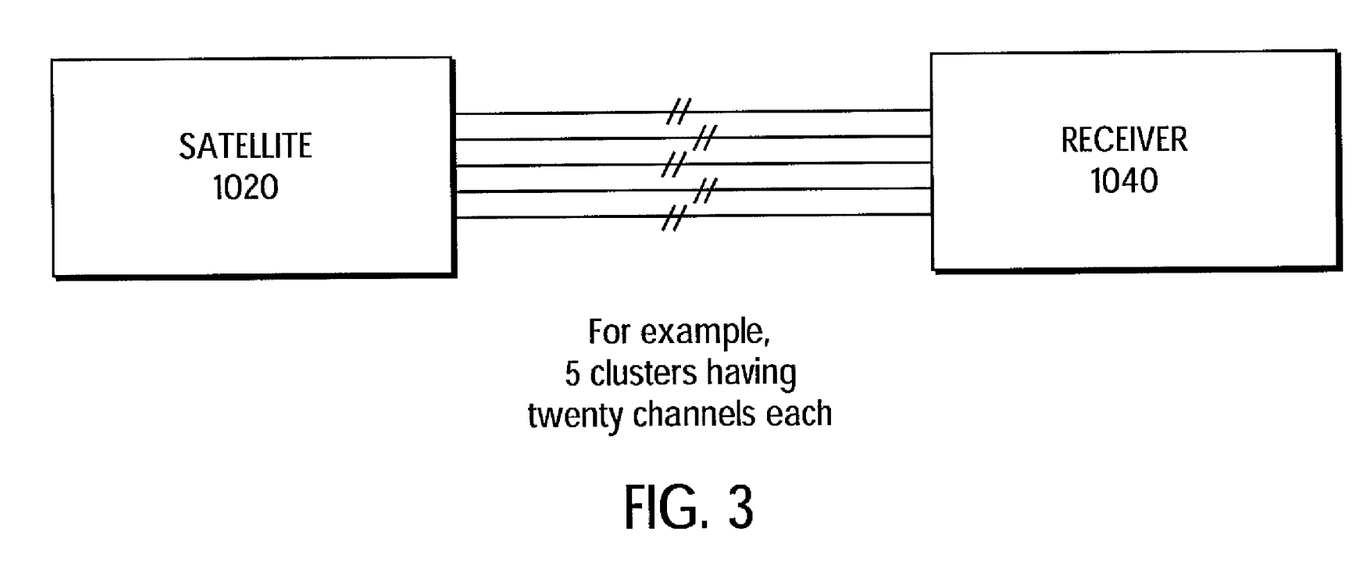
FIG. 3 illustrates the transmission of programming from a satellite to a receiver in the exemplary embodiment of the personalized broadcasting system.

FIG. 3 illustrates the exemplary transmission of programming, from a satellite to a receiver. According to an exemplary embodiment of the present invention, numerous channels of programming are transmitted from a satellite 1020 to a receiver 1040. The numerous channels can be transmitted, for example, in a single beam or multiple beams. The numerous channels can be divided into, for example, five clusters that each contains twenty channels. For example, each cluster may contain ten music channels featuring music from different genres, such as: country; Top 40; contemporary; classical; rhythm and blues; jazz; religious; eclectic; Latin; and Broadway. Each cluster also may contain ten channels featuring talk/news programming, such as current events, sports, entertainment, weather, local etc. Also transmitted with each cluster is, for example, a service channel that contains program descriptive text, or PDT.

The PDT contains, for example, information about the programming currently being broadcast and to be broadcast on each channel (e.g., the next program or programs to be broadcast on a particular channel). PDT for all of the clusters can be provided in each cluster so that regardless of the cluster currently in use, all available channels can be constantly evaluated by the receiver using the playlist. For example, for the music channels, the PDT contains information for the current song being played, as well as the next songs to be played on a channel. Music information includes, for example, title of the song, artist, album, length of the song, music time, etc. Similarly, the PDT for talk channels includes, for example, program title, program time, program topic, date the program was first aired, and length of the program. The PDT can also contain features or characteristics of the programming that each channel is airing as deemed appropriate by the broadcasting system. In an alternative embodiment, instead of having a separate service channel or group of service channels containing the PDT information, the PDT information can be embedded within each of the broadcast channels themselves, and the PDT on each channel can be constantly or regularly monitored.

Figure 4:
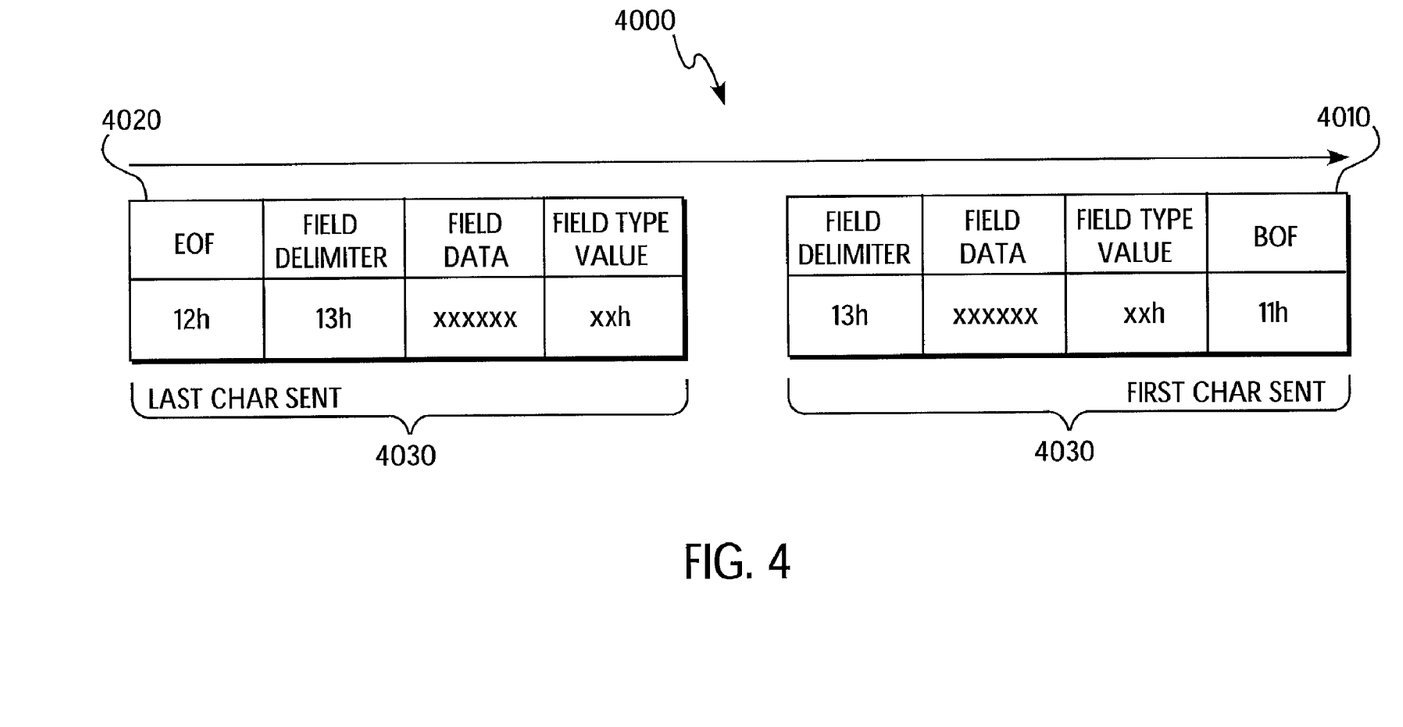
FIG. 4 illustrates an exemplary data structure used in the exemplary embodiment of the personalized broadcasting system.

FIG. 4 illustrates an example of PDT structure according to an embodiment of the present invention. The information being transmitted on the PDT can be formatted using, for example, simple ASCII based protocol. A complete string of formatted ASCII data contains selected "fields" of information, the PDT frame 4000, for a single audio event, individually delimited and identified by field type values. Each field is framed by, for example, a "beginning of frame" (BOF) character 4010 and an "end of frame" (EOF) character 4020. Examples of the audio events are: any single song; spot; liner; voice-track; show; or other piece of playable program material.

The PDT frame 4000 is flexible so as to allow the inclusion or exclusion of PDT fields 4030. The fields 4030 can vary with each individual channel. For example, a classical music channel may require a PDT field for the composer's name, but a pop music channel would not. Thus, it is not necessary for every channel to have PDT frames of the same length or the same types of fields.

Each PDT field 4030 can be delimited, or terminated, with an ASCII character, for example "13 h." The PDT fields are arranged in, for example, ascending order starting from the BOF character 4010. Each PDT field 4030 begins with, for example, an 8-bit field type value followed by the field data and ends with the field being delimited by ASCII characters 13h.

Figure 5:
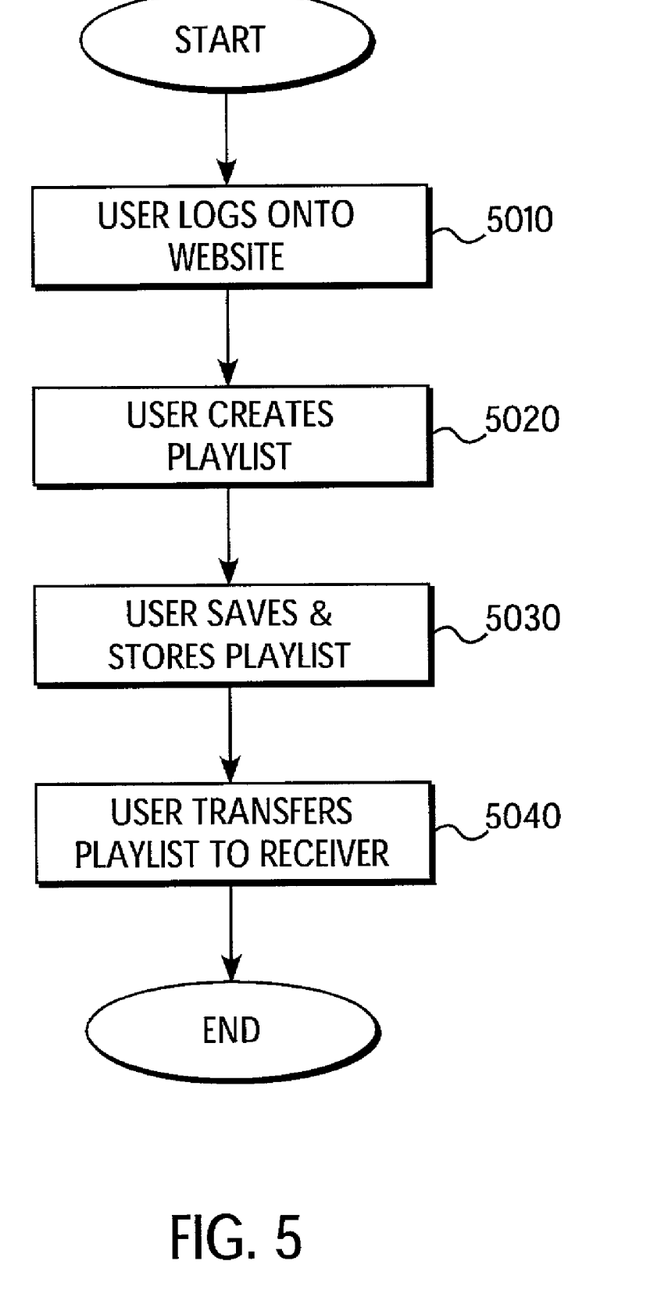
FIG. 5 illustrates a flow diagram depicting a method of creating a playlist implementing the exemplary embodiment of the personalized broadcasting system.

FIG. 5 depicts a flow diagram showing the process of creating a playlist to be used in the receiver according to an exemplary embodiment of the present invention. At 5010, the user, or listener, logs onto the website hosted by the transmission facility, such as www.siriusradio.com.

At 5020, the website prompts the user to create a playlist. The playlist identifies and prioritizes the selections that the user would like to hear. Multiple playlists can be developed by the user for different activities or occasions. For example, a playlist for commuting can be created for use in a car radio, while a playlist for use on family trips also can be created. These playlists may include, for example, selections such as news programs like National Public Radio's All Things Considered or traffic and weather reports. Another playlist can be used in a personal portable stereo that contains selections for tracks appropriate for exercising. This playlist could include music with fast tempos and rhythms. Yet another playlist can be put together based on a person's moods. For example, a "mellow" playlist could contain jazz selections.

The user first enters an identifier for a playlist, for example "Playlist for Tuesday." Next, the user specifies what selections he would like to hear. The use of the terms "selections" can mean not only specific songs or programs but also features or characteristics of music, artists, or new programs. For example, a selection could be specific songs like U2's Bad; specific artists like Sting; specific programs like National Public Radio's Morning Edition; and specific events, such as the annual State of the Union address. A selection could also be specific features or characteristics of programming like news commentary about space exploration, artists from the eighties, or baroque classical music. The user can also select to hear emergency information regarding traffic jams or inclement weather. For illustrative purposes only, assume that the playlist "Playlist for Tuesday" includes the following selections: Car Talk (a talk show), Sting (an artist), and Game 4 of the World Series (a specific program).

For each selection, the user specifies, for example, a rank and whether the selection can be interrupted by another selection with a higher rank, referred to as the interruption permission. For example, the ranking can be based on a numerical system from one to five such that five is of the highest rank. Thus, the user can specify that Game 4 of the World Series has a rank of 3 and an interruption permission of "no." Car Talk can have a rank of 4 and an interruption permission of "yes." The interruption permission can be used to prevent or allow an existing program from being interrupted and replaced when another program of higher rank is available on another channel.

In addition to the selections, the user may pick a default channel that the receiver would automatically play if none of his selections are being played on any other channel. For example, the default channel could be "Channel 10—Classical Music." The default channel could, for example, have a rank of one and an interrupt permission of "yes." Table 1, below, shows the selections and the settings for "Playlist for Tuesday."

TABLE 1

| Selection | Rank | Interrupt Permission |
|---|---|---|
| Car Talk | 4 | yes |
| Sting | 5 | yes |
| Game 4 of the World Series | 3 | no |
| Channel 10 - Classical Music (default) | 1 | yes |

The user could also add songs to his playlist by hitting a button on the receiver. For example, many times a person may not know the title or artist of a particular song he enjoys hearing. The next time this song plays on the radio, the user could, for example, press a key on the receiver and have that song added to his playlist. Because the PDT is available for all programs, the PDT for this selection can be used to update the user's playlist.

At 5030, the user saves and stores the playlist. The playlist can be stored on the server hosting the website or on a portable storage medium or both. If, for example, the playlist is stored on the server, the user could be prompted to enter an identifier and/or a password that would allow the user to be able to modify or access his playlists at a future date. The host could also use the playlists stored on the server to collect business intelligence on subscribers to develop more targeted programming based on user preferences and for other business purposes.

Alternatively, the playlist can be downloaded from the website onto a portable storage medium. Examples of portable storage media include, but are not limited to, smartcards, flash cards, memory sticks, floppy disks, zip disks, compact disks, PCMCIA card, personal data assistant, mobile phone, or any other media capable of retaining the playlist.

At 5040, the user transfers the playlist from the storage medium to the playlist module located within the receiver. The receiver can read the data on the storage media through a variety of methods. In addition to the physical transfer of the playlist described above, wireless methods transfer the playlist to the receiver include, but are not limited to, satellite, infrared, cellular technology, and SMS, as well as scanning, disk drives, and direct connection download.

Alternatively, for example, instead of the receiver receiving the playlist from a portable storage medium, the receiver may be able to receive the playlist directly from the server that hosted the website. For example, that server can communicate with the receiver through wireless means to transfer the playlist. Once the playlist is transferred to the receiver, the central processing unit of the receiver is able to interpret the playlist and direct the receiver to identify the selections, as shown in the next figure.

Figure 6:
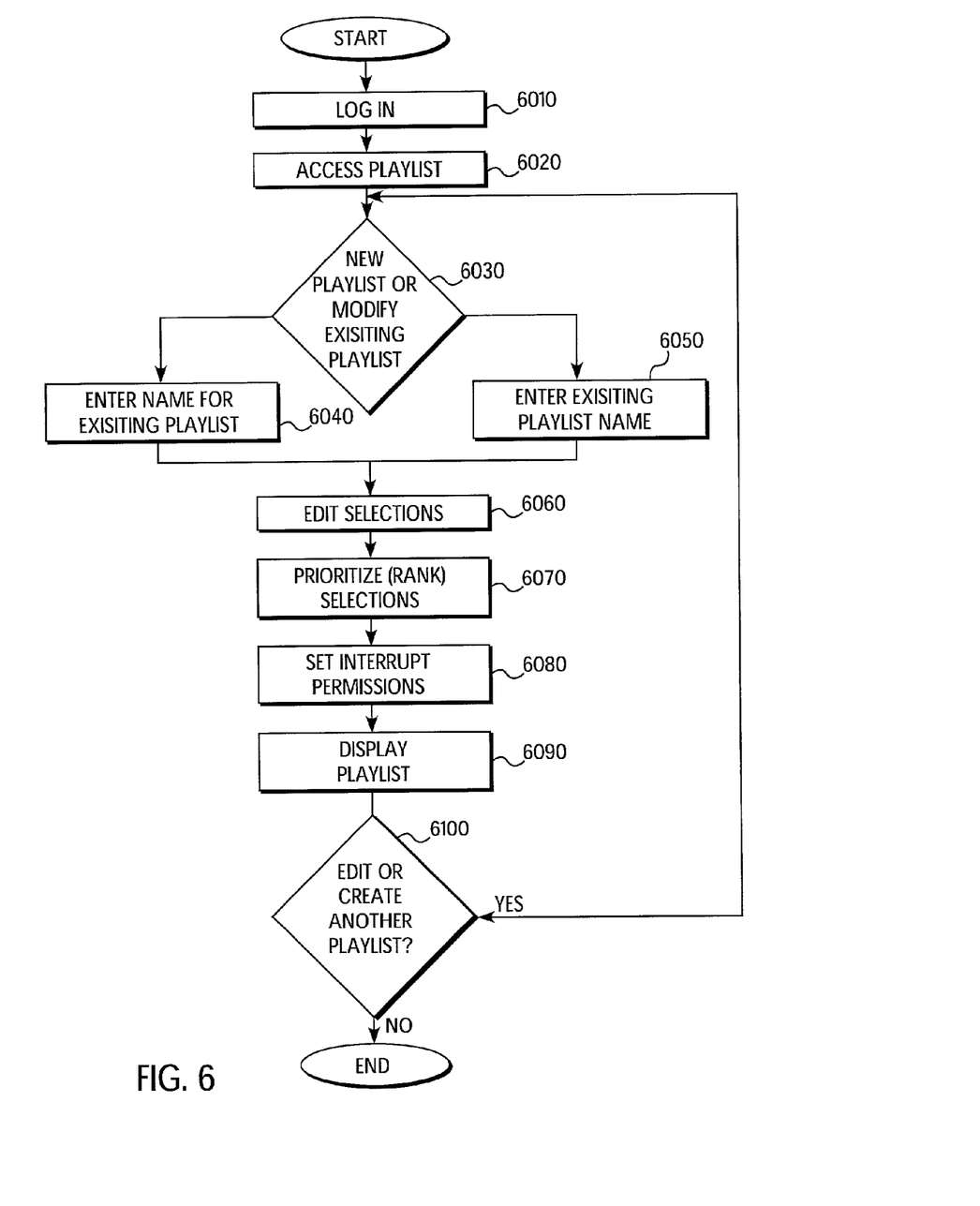
FIG. 6 illustrates another flow diagram depicting the process to create a playlist in the exemplary embodiment of the personalized broadcasting system.

FIG. 6 illustrates another flow diagram depicting the process a user uses to create a playlist in more detail in accordance with an exemplary embodiment.

At 6010, the user logs into a website (e.g., www.siriusradio.com). At 6020, The user chooses to create a playlist in the manner described above.

At 6030, the website, for example, prompts the user to either create a new playlist or modify an existing playlist (e.g., a script running on a server at the website providing the prompt). If the user desires to create a new playlist, then, at 6040, the website prompts the user to enter a name for the playlist. If the user desires to modify an existing playlist, then, at 6050, the website prompts the user to enter the name of the playlist to be modified (e.g., "Playlist for Tuesday.")

At 6060, the user can enter new selections he would like to hear or delete current selections. Alternatively, he can leave the playlist as is.

At 6070, the user has the option to reprioritize or reassign a rank for each selection. At 6080, the user can designate the interrupt permission for each selection on the playlist.

At 6090, the website (e.g., a script running on a server at the website providing the prompt) lists all of the selections of the playlist, along with their respective ranks, if any, and interrupt permission, if any.

At 6100, the website (e.g., a script running on a server at the website providing the prompt) asks if the user would like to create or modify another playlist. If so, the user is returned to 6030; otherwise, the process ends.

Figure 7:
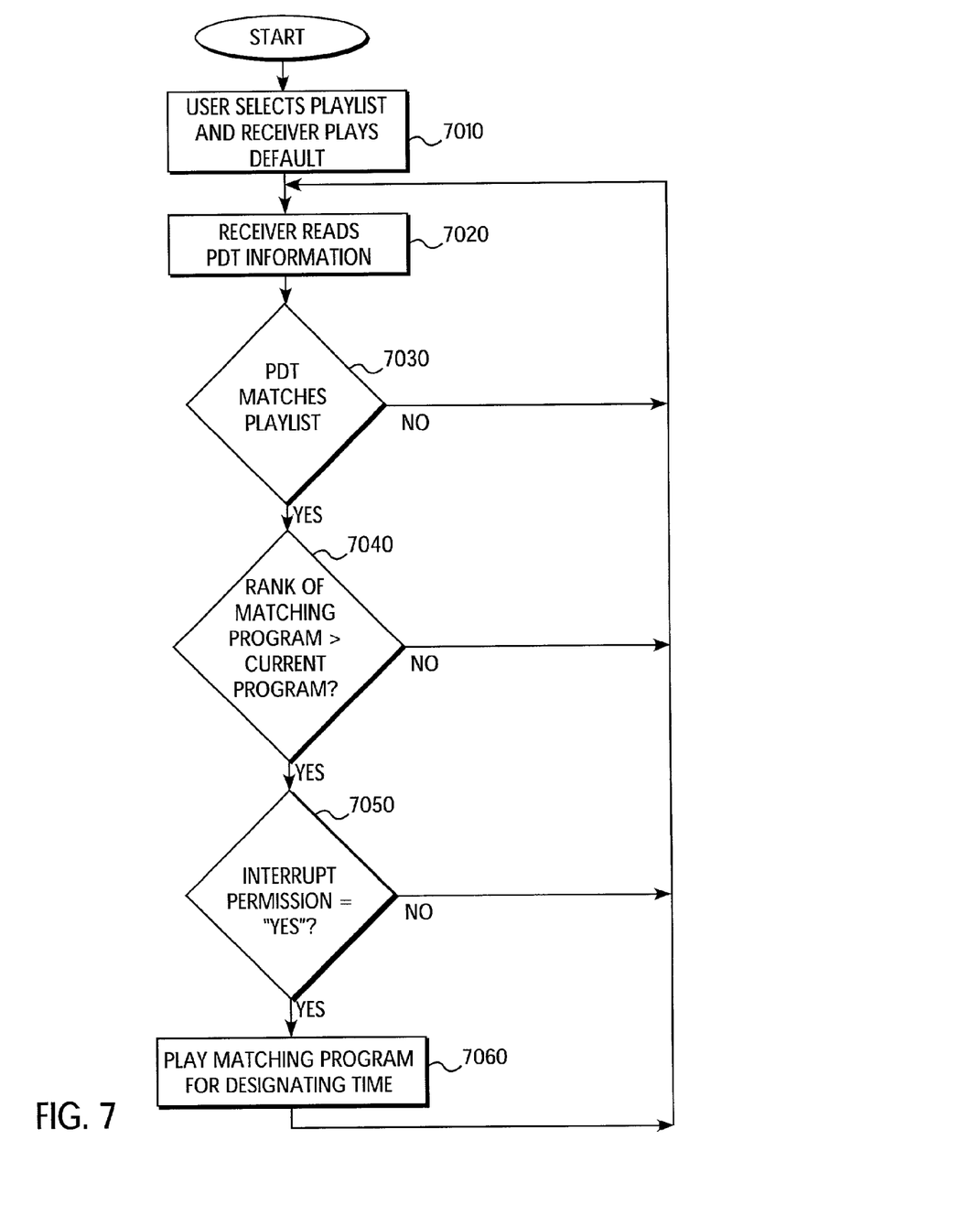
FIG. 7 illustrates a flow diagram depicting the process to select programming to be played in the exemplary embodiment of the personalized broadcasting system.

FIG. 7 illustrates a flow diagram depicting the process a receiver uses in selecting programming to be played in the exemplary embodiment of the personalized broadcasting system.

At 7010, when the receiver is first turned on, a user can select which playlist he would like to use. For illustrative purposes only, assume the user selects "Playlist for Tuesday" discussed above. Alternatively, the user can select no playlist and manually search all of the channels for programming that he would like to hear. When the user selects "Playlist for Tuesday," the receiver automatically plays the default channel. In this case, the receiver automatically plays Channel 10—Classical Music.

Although the user selects a playlist, the user is not bound by the playlist. If the user chooses not to use a playlist, he can turn off the playlist at any time the receiver is being used. Thus, the playlist could be turned off to prevent any interruptions. This feature can be activated by, for example, a pause button or a key or switch on the receiver.

At 7020, the receiver receives the PDT for all of the channels, whether by scanning a service channel or several service channels or by directly reading the PDT information from all of the channels.

At 7030, the receiver evaluates the PDT and determines whether any of the data on the PDT match the information stored on the playlist. For example, the PDT may identify that songs by the Rolling Stones, Madonna, or Pink Floyd and shows like Morning Edition or Bloomberg are currently being broadcast or scheduled to be broadcast. Since none of these programs match the contents of "Playlist for Tuesday", the receiver continues to broadcast Channel 10—Classical Music. The process then returns to 7020.

If the PDT shows that a program like Game 4 of the World Series is to be aired on Channel 82 from 8:00 p.m., then there is a match between the PDT and a selection on the playlist, and the receiver proceeds to 7040.

At 7040, the receiver compares the rank of the matching program (e.g., Game 4 of the World Series) with the rank of the program already being played (e.g., the default Channel 10). Since the rank of the matching program, three, is greater than the rank of the current program, one, the receiver proceeds to 7050. If the matching program's rank is not greater than the rank of the current program, then the receiver returns to 7020.

At 7050, the receiver determines whether the interrupt permission of the program currently played is set to "yes." If so, then the receiver automatically tunes to the specified channel of the matching program for the designated time period in step 7060. If the interrupt permission is set to no, then the current program continues to play, despite the fact that the matching program has a higher rank. This would be the case if Car Talk, with rank four, were being compared against Game 4 of the World Series, with rank three. The receiver continues to play Game 4 of the World Series, since it has an interrupt permission set to "no."

Additionally, alternative embodiments can be implemented to determine what program is being played. Instead of rank and interrupt permission, the receiver can use the rank alone or some other parameter, like length of program time or time which program will be broadcast.

Additional advantages and modifications will readily occur to those skilled in the art. Therefore, the present invention in its broader aspects is not limited to the specific details and representative devices shown and described herein. Accordingly, various modifications may be made without departing from the spirit or scope of the general inventive concept as defined by the appended claims.

The invention claimed is:

1. An article of manufacture, comprising:
   a computer usable medium having a computer readable program code embodied therein, the computer readable program code including:
   computer readable program code for receiving data relating to at least one of a plurality of broadcast channels, the data relating to the at least one of the plurality of broadcast channels including a content identification signal for said channel and at least one other channel from the plurality of broadcast channels; and
   computer readable program code for processing the received data and for automatically tuning a receiver to a specific broadcast channel if the content identification signal for one of said other channels from the plurality of broadcast channels matches a selection in a playlist including a prioritized list of user selections,
   wherein said content identification signal identifies content being broadcast on a given channel.

2. The article of claim 1, wherein the receiver is located in a vehicle.

3. The article of claim 2, wherein the vehicle is an automobile.

4. The article of claim 1, wherein the plurality of broadcast channels are transmitted by at least one satellite.

5. The article of claim 1, wherein the plurality of broadcast channels are transmitted by at least one terrestrial transmitter.

6. The article of claim 1, wherein the playlist is created by a user accessing a website.

7. The article of claim 6, wherein the playlist is transferred from the website onto a portable storage medium.

8. The article of claim 7, wherein the portable storage medium includes one of a PCMCIA card, smart card, flash card, memory stick, compact disk, or floppy disk.

9. The article of claim 1, wherein the data including the content identification signals is transmitted in at least one service channel containing the content identification signal for said channel and said at least one other channel from the plurality of broadcast channels.

10. The article of claim 9, wherein the receiver scans the at least one service channel as a function of the playlist.

11. The article of claim 1, wherein the user selections of the playlist have at least one associated parameter used to determine the broadcast channel selected by the receiver.

12. The article of claim 11, wherein the at least one associated parameter includes a rank.

13. The article of claim 11, wherein the at least one associated parameter includes an interrupt permission.

14. The article of claim 1, wherein processing the data includes identifying the content identification signals for the said channel and said at least one other channel from the plurality of broadcast channels.

15. The article of claim 1, wherein processing the data includes identifying the content for the one of the plurality of broadcast channels.

16. The article of claim 1, wherein the content identification signal for said channel and said at least one other channel from the plurality of broadcast channels includes the content identification signal for each of the plurality of broadcast channels.

17. The article of claim 1, wherein the content identification signal for said channel and said at least one other channel from the plurality of broadcast channels includes the content identification signal for a cluster of broadcast channels.

18. The article of claim 1, wherein when the receiver is automatically tuned to a specific broadcast channel a signal is generated to a user.

19. The article of claim 18, wherein said signal is at least one of a display of text, a display of graphics, an audible tone and a set of linguistic phonemes.

20. A programmable receiver, comprising:
   an antenna module receiving a plurality of broadcast channels; and
   a receiver module coupled to the antenna module, the receiver module receiving data relating to at least one of the plurality of broadcast channels, data relating to the at least one of the plurality of broadcast channels including a content identification signal for said channel and at least one other channel from the plurality of broadcast channels;
   wherein the receiver module includes a memory, the memory including a playlist identifying a prioritized list of selections and the receiver automatically tunes to a specific broadcast channel if the content identification signal for one of said other channels from the plurality of broadcast channels matches a selection in the playlist stored in the memory
   wherein said content identification signal identifies content being broadcast on a given channel.

21. The receiver of claim 20, wherein the plurality of broadcast channels is transmitted from one of a satellite and a terrestrial transmitter.

22. The receiver of claim 20, wherein the plurality of broadcast channels are transmitted in a plurality of clusters.

23. The receiver of claim 22, wherein each of the plurality of clusters includes a content identification signal for each of the plurality of clusters.

24. The receiver of claim 20, wherein the content identification signal comprises a plurality of fields.

25. The receiver of claim 24, wherein the plurality of fields comprise text fields including descriptions of content being played on each of the broadcast channels.

26. The receiver of claim 24, wherein the plurality of fields includes a description of a music selection.

27. The receiver of claim 24, wherein the plurality of fields includes a description of a talk program.

28. A method for receiving personalized broadcasts, comprising:
   receiving in a receiver having a memory disposed therein, data relating to at least one of a plurality of broadcast channels, data relating to the at least one of the plurality of broadcast channels including a content identification signal for said channel and at least one other channel from the plurality of broadcast channels;
   storing a playlist of prioritized selections in the memory; and
   automatically tuning the receiver to a respective one of the plurality of broadcast channels if the content identification signal for one of said other channels from the plurality of broadcast channels matches a prioritized selection in the playlist,
   wherein said content identification signal identifies content being broadcast on a given channel.

29. The method of claim 28, further comprising transferring the playlist into the memory from a portable storage medium.

30. The method of claim 28, further comprising transferring the playlist into the memory using a wireless transmission method.

31. The method of claim 28, further comprising generating the playlist by accessing a website.

32. The method of claim 28, wherein the playlist includes at least one parameter associated with each prioritized selection.

33. The method of claim 32, wherein the at least one parameter includes a rank.

34. The method of claim 32, wherein the at least one parameter includes an interrupt permission.

35. The method of claim 28, wherein the receiver is located in a vehicle.

* * * * *